_United States Patent_ [19]

Cornet

[11] 4,371,954
[45] Feb. 1, 1983

[54] REVERSIBLE MEMORY STRUCTURE WITH THERMO-OPTICAL WRITING AND OPTICAL READING AND PROCESS FOR WRITING AND ERASING SAID STRUCTURE

[75] Inventor: Jean Cornet, Paris, France

[73] Assignee: Thomson-CSF, Paris, France

[21] Appl. No.: 228,990

[22] Filed: Jan. 27, 1981

[30] Foreign Application Priority Data

Feb. 1, 1980 [FR] France .............................. 80 02245

[51] Int. Cl.³ .......................... G11C 13/04; G11B 7/24
[52] U.S. Cl. ..................................... 365/126; 365/106;
365/113; 365/120; 365/124; 369/100; 369/109;
369/275; 369/284; 369/286; 369/288
[58] Field of Search ............... 365/106, 113, 120, 124,
365/126; 369/100, 109, 275, 284, 286, 288

_Primary Examiner_—George G. Stellar

[57] ABSTRACT

The invention relates to a reversible memory structure with thermo-optical inscription or writing and optical reading on a moving support.

According to the invention, the memory structure deposited on a substrate (1) is constituted by a double layer (2 and 3). A second alloy layer (3) at ambient temperature in the martensitic phase is deposited on a first thermally deformable layer (2). A heat pulse creates a deformation in the first layer, which deforms the martensitic alloy layer. A more powerful heat pulse raises the alloy layer to a temperature above its transformation point from the martensitic phase to another crystallographic phase and erases the inscribed deformation.

Particular application to optical disks.

7 Claims, 4 Drawing Figures

REVERSIBLE MEMORY STRUCTURE WITH THERMO-OPTICAL WRITING AND OPTICAL READING AND PROCESS FOR WRITING AND ERASING SAID STRUCTURE

BACKGROUND OF THE INVENTION

The present invention relates to a reversible memory structure, i.e. it can be thermo-optically written and erased, whilst reading is optical.

It applies more particularly to the inscription or writing layer of a memory storing data on a moving support. One widely used form of this memory is the optical disk. Optical disks are made from a disk of a rigid and generally transparent material covered with a thin film of a light-absorbing material. The disk rotates at a relatively high speed and passes in front of a reading head, which detects the data which have been recorded in the surface absorbent layer. The data are generally stored in the form of perforations in the absorbent layer. Thus, reading can take place by passing a laser beam through the data storage holes and through the transparent support of the optical disk. It can also be carried out by reflecting a laser beam through the transparent support of the disk onto the absorbent layer. The data can also be stored in the form of a surface deformation in which case reading takes place by reflection.

The existing technology of optical disks or in more general terms moving memories has two types of structure for the writing or inscription layer, namely non-erasable structures such as those in which are made perforations of the metal layer constituting the absorbent layer, or erasable structures. Erasable structures are based on the use of amorphous, metallic or semiconducting materials or magnetooptic, photochromic or photodichroic materials having differences in the optical properties depending on whether or not they are inscribed by a laser beam. The general disadvantage of such erasable structures is a low signal-to-noise ratio because there is no fundamental modification of the structure of the absorbent layer material.

BRIEF SUMMARY OF THE INVENTION

The invention relates to a novel reversible memory structure, i.e. it can be erased and reinscribed, which has a better signal-to-noise ratio than the known memories. This structure is constituted by a two-layer assembly deposited on the disk support having a low thermal expansion coefficient. The two-layer assembly in a first embodiment comprises a first layer made from a metallic material having a high expansion coefficient and a second layer formed from an alloy at ambient temperature in a martensitic phase and having a transformation towards another crystallographic phase at a temperature below the melting temperature of the first layer. In addition, said second layer has a low expansion coefficient and preferably low or moderate adhesion properties with respect to the metal of the first layer.

According to a second embodiment, the first layer which can be degraded at low temperature, i.e. approximately 200° C. above ambient temperature.

More specifically, the present invention relates to a reversible memory structure with thermo-optical writing or inscription and optical reading, supported by a substrate performing a forward movement, wherein the substrate is a material having a low expansion coefficient and the inscribable layer deposited on the substrate is formed by at least two individual layers, constituted by a first layer made from a material which, under the action of heat, deforms a second superimposed layer of a relatively inexpansible alloy which is at ambient temperature in a martensitic phase and has a transformation to another crystallographic phase at a temperature below the melting temperature of the first layer.

BRIEF DESCRIPTION OF THE DRAWINGS

The invention is described in greater detail hereinafter relative to a non-limitative embodiment of the memory structure and with reference to the attached drawings, wherein show.

DETAILED DESCRIPTION OF THE PREFERRED EMBODIMENTS

In order to simplify the description, the embodiment chosen for the explanation of the invention is that in which the first layer is metallic.

Certain alloys are characterized by a transformation in the solid phase at a temperature $T_t$ between a generally centre cubic high temperature phase where the atoms are arranged in random manner at the lattice nodes and a generally orthorhombic low temperature phase where one or more atom types are located at particular positions and in particular planes of the lattice. This so-called martensitic transformation is reversible and is generally obtained by a coordinated sheer process which step by step affects the complete structure. It is therefore a very rapid process, because it involves no individual atom migration over long distances.

When the temperature drops below $T_t$ the "precipitation" of atoms in the preferred planes of the martensite leads to the formation of small interconnected plates with variable orientations. Certain plates are under tension, whilst others are under compression and the internal stress state defines the relative surfaces of the different types of plates in order to reduce the internal energy to a minimum.

Figure 1:
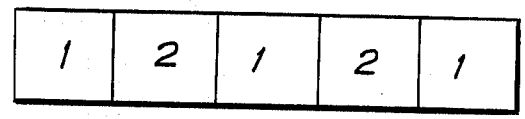
FIG. 1 a diagram showing the state of a martensite in the absence of tension.

FIG. 1 shows two types of plates which, for reasons of simplicity, are assumed to develop with the same speed. Plate 1 is assumed to be under compression and plate 2 under tension.

Figure 2:
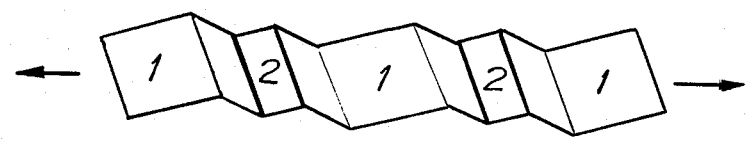
FIG. 2 an equivalent diagram to that of FIG. 1, but showing a martensite under tension.

In FIG. 2, when a tensile stress is applied to the material, there is a preferred growth of the plates 2 and consequently the structure is deformed.

Figure 3:
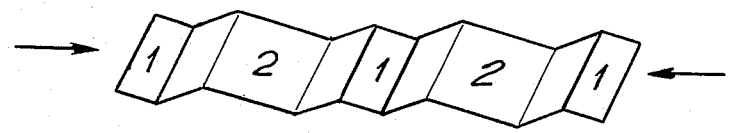
FIG. 3 an equivalent diagram to that of FIG. 1 when a martensite is compressed.

If a tensile stress is used in FIG. 3, deformation takes place in the other direction. It should be noted that this is an overall microscopic deformation, without relative sliding of the crystallographic planes, as occurs with conventional plastic deformation. The resultant effect is the same if the sample is deformed instead of stressed.

In summarizing, a deformation in the martensitic phase has the added essential interest of taking place by shear and not by interplanar sliding. Thus, such a deformation can be completely erased by eliminating the martensitic lamellas, this taking place as soon as the temperature exceeds $T_t$. As opposed to this, deformations of the plastic type involving interplanar sliding cannot be erased.

The memory action of a martensitic crystallographic structure is utilized in the invention in which an optical disk support is covered by a first layer of a metal having a high expansion coefficient and by a second layer of an alloy in a martensitic phase and having a transformation point $T_t$ below the melting point of the first layer. Moreover, the alloy must have a low expansion coefficient and preferably low or moderate adhesion to the metal of the first layer.

Figure 4:
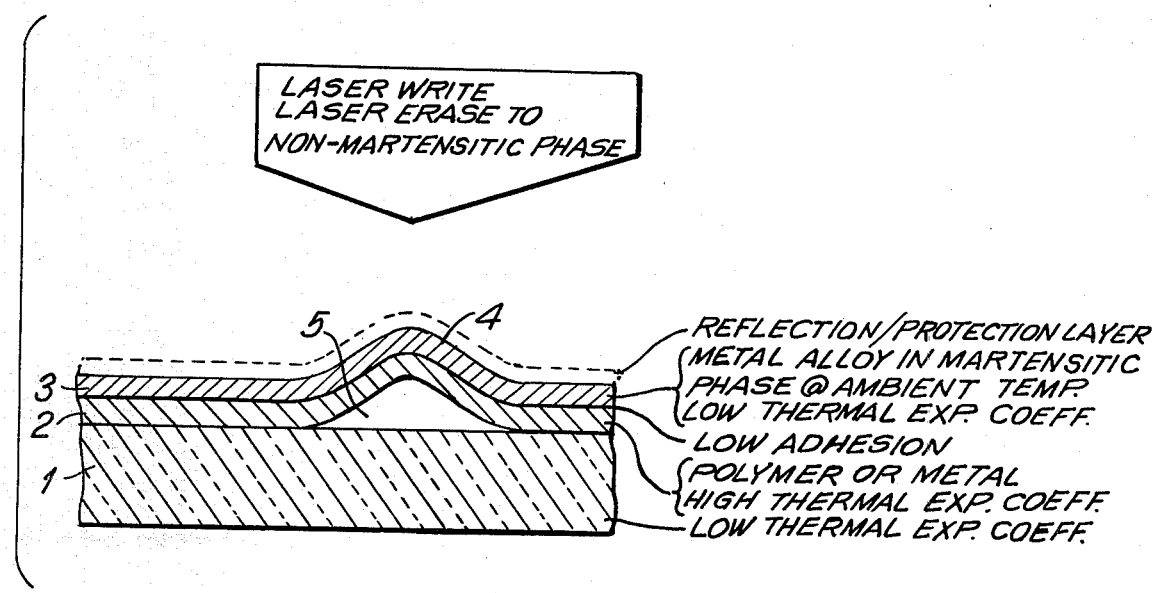
FIG. 4 a sectional view of a reversible memory structure according to the invention.

FIG. 4 shows the reversible memory structure according to the invention.

Onto a preferably flat, rigid and transparent substrate 1 (without these characteristics being essential) are deposited a first metal layer 2 and then a second metal layer 3. According to a preferred embodiment of the invention, the first metal layer 2 is the layer of the metal having the high expansion coefficient, whilst the second metal layer 3 is the alloy layer in a martensitic phase at ambient temperature. Under the action of a heat pulse during the inscription of data on the disk, the energy quantity supplied by the laser beam at its impact point with the surface of the disk is absorbed by the assembly of the two metal plates and transformed into heat. The resulting heating at a temperature T below temperature $T_t$ leads to the differential expansion between the two metal layers. The highly expansible layer 2 imposes on the less expansible layer 3 a deformation which is below the breaking limit deformation of layer 3. Thus, a relief in the form of protuberance 4 is obtained for layer 3. During the deformation of the two layers, at 5 there is a disengagement of the two-layer assembly with respect to the substrate. The permanent deformation of layer 3 only applies to the martensite plates, without affecting the atomic skeleton. Following the impact of the laser beam and during cooling, the expansible layer 2 is disengaged from the martensite layer 3, but does not affect data inscription on the disk.

The present structure is erasable and reversible in the sense that if the martensitic layer 3 is raised to a temperature exceeding the transformation point $T_t$ of the martensitic phase into its parent phase either by a higher power pulse, or by a slower displacement of the support in front of the energy source, or by an overall heating, the alloy is brought into its parent phase and assumes its initial form again by re-adhering to the relatively inextensible layer 2, which has previously assumed its initial form. Following the erasure operation, which takes place at a relatively high temperature, i.e. above the transformation point $T_t$, the alloy layer 3 returns to the martensitic phase during cooling.

Consequently, starting with a planar structure having a first highly expansible layer and a second relatively inexpansible layer, but in the martensitic phase at ambient temperature, it is possible to record data in the form of a surface deformation of the inscribable layer and then erase said data and return to the initial state by a second operation of heating to a temperature above that of a first data inscription operation.

The construction of the memory structure in accordance with the invention involves the use for the layer of highly expansible metal of one of the following materials, considered either individually or in combination: cadmium, zinc, thalium, magnesium, aluminium, manganese or silver. The second metal layer, i.e. the martensitic phase alloy layer is obtained during a vacuum metallization operation following the metallization of the first metal layer in the same frame and without any technology change by the deposition of one of the following alloys in their martensitic phase: iron-nickel, iron-platinum, titanium-nickel, nickel-aluminium, gold-cadmium, copper-zinc or stainless steels or ternary mixtures such as copper-zinc-aluminium containing 68 to 30% copper, 10 to 28% zinc, 4 to 10% aluminium and in accordance with the formula $Cu_{75}Zn_{18}Al_7$, whose transformation point is equal to 170° C. and the formula $Cu_{79}Zn_{13}Al_8$, whose transformation point is equal to 300° C.

The thickness required for each of the two layers 2 and 3 in FIG. 4 is approximately 3 to 5 nanometers.

This type of reversible memory structure has a certain number of practical interests.

Firstly, the erasure speed is very high, because there is no atomic migration. Instead, sheer takes place which affects the entire structure step by step. Thus, in order to erase the inscribed data it is merely necessary to move the recorded memory beneath a laser head supplying a certain energy quantity. Secondly, this erasable structure has a better signal-to-noise ratio than other known erasable structures.

In addition, the construction technology is simplified, because the deposition of the metal layers 2 and 3 is carried out by one operating sequence in the same vacuum frame.

The recorded data can be protected due to the state of hardness of the recorded surface by depositing a photosensitive, thermal lacquer, by dissolved polymer varnish or by a preferably transparent, rigid cover which protects the complete surface of the recorded memory.

On the basis of these considerations regarding the value of the recorded surface state it follows that duplication is possible, e.g. by means of photopolymerizable lacquers. Thus, file or archive formation is possible by depositing thick metal layers for the purpose of storing the recorded data for long periods.

This erasable memory structure is mainly used in the case of optical disks, but in more general terms can be used for thermo-optical recording archive formation means and optical reading on rigid or flexible, planar or cylindrical supports effecting either a rotary or a linear movement.

The scope of the invention also covers cases in which there are more than two metal layers, i.e. when the support is firstly covered with a metal attachment layer for the highly expansible metal layer 2, followed by a fourth metal layer deposited on the martensitic layer 3. The fourth metal layer provides the surface of the recorded memory with a better reflection state or a protection, e.g. against oxidation.

Other variants of the invention can be gathered from the claims.

What is claimed is:

1. A reversible memory structure with thermo-optical writing or inscription and optical reading, supported by a substrate performing a forward movement, wherein the substrate is a material having a low expansion coefficient and the inscribable layer deposited on the substrate is formed by at least two individual layers, constituted by a first layer made from a material which, under the action of heat, deforms a second superimposed layer of a relatively inexpansible alloy which is at ambient temperature in a martensitic phase and has a transformation to another crystallographic phase at a temperature below the melting temperature of the first layer.

2. A memory structure according to claim 1, wherein the first layer is a highly expansible metal layer and made from the following metals: Cd, Zn, Ti, Mg, Al, Mn, Ag, considered individually or in alloy form.

3. A memory structure according to claim 1, wherein the first layer is a polymer layer which can be degraded by heating.

4. A memory structure according to claim 1, wherein the martensitic layer is produced from one of the following alloys: stainless steel, Fe-Ni, Fe-Pt, Ti-Ni, Ni-Al, Au-Cd, Cu-Zn, Cu-Zn-Al.

5. A memory structure according to claim 1, wherein inscription leads to a deformation of the martensitic layer, said deformation being less than the breaking limit of said martensitic layer.

6. An inscription or writing process in a memory structure according to any one of the claims 1 to 5, wherein the inscription means is an energy pulse supplied by a laser beam and absorbed by the double metal layer of the structure in which it is transformed into heat, the energy quantity supplied being sufficient for the first expansible metal layer to deform the second martensitic alloy layer, the temperature remaining below the transformation point of the martensitic phase into another phase.

7. An erasure process of a memory structure in which data has been inscribed according to claim 6, wherein the erasure means comprise an energy pulse supplied by a laser beam and absorbed by the double metal layer of the structure in which it is transformed into heat, the energy quantity supplied being adequate to erase the second alloy layer to a temperature above the transformation point of the martensitic phase into another phase.

* * * * *